Aug. 2, 1938.   W. C. LAUGHLIN   2,125,846
MAGNETIC SEWAGE CLARIFICATION
Filed April 15, 1936   2 Sheets-Sheet 1
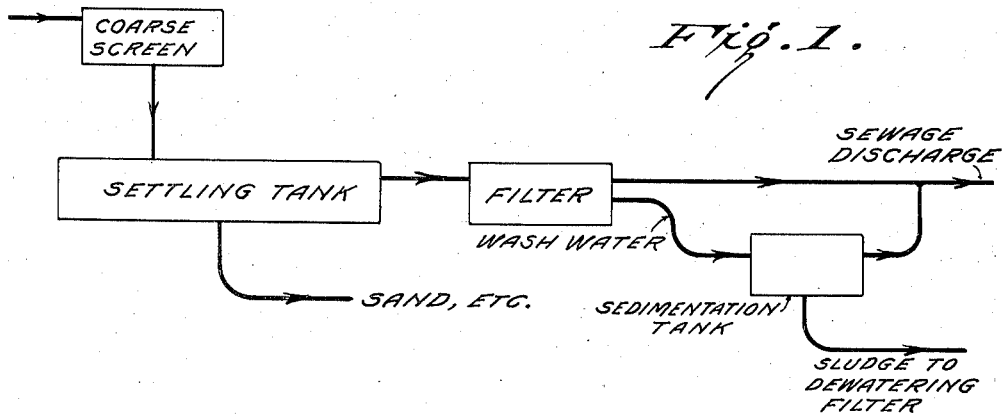
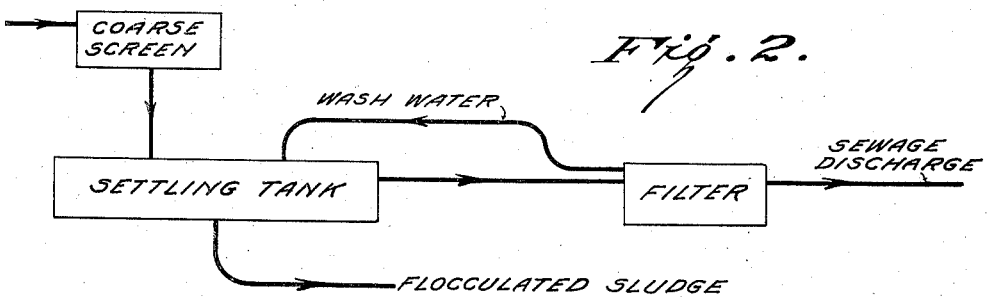
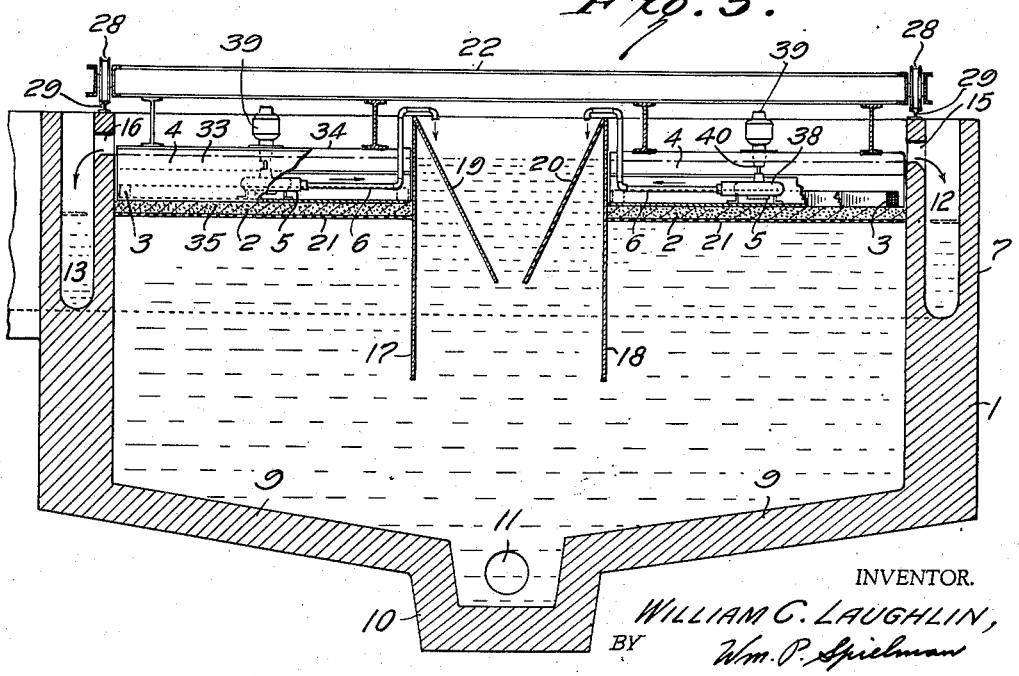
INVENTOR.
WILLIAM C. LAUGHLIN,
BY
ATTORNEY.

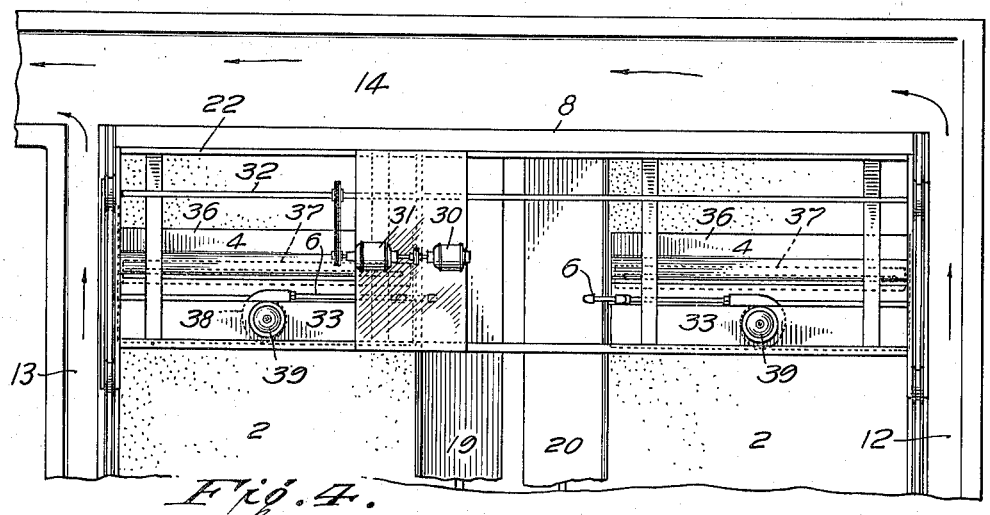
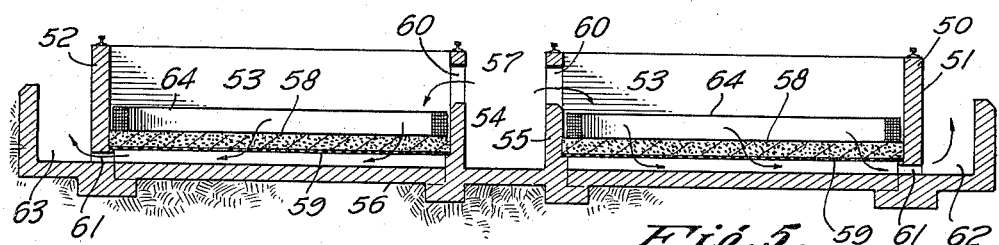
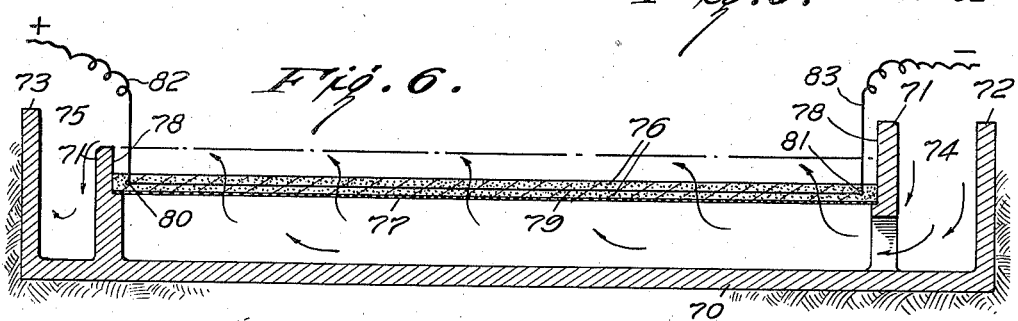
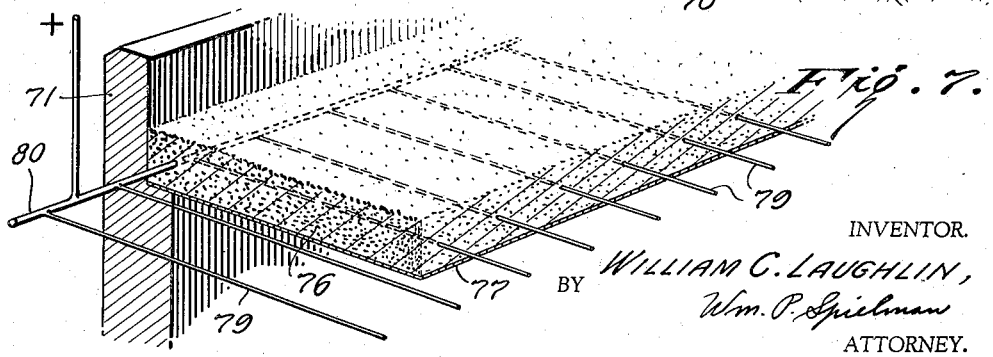

Patented Aug. 2, 1938

2,125,846

UNITED STATES PATENT OFFICE 2,125,846

MAGNETIC SEWAGE CLARIFICATION

William C. Laughlin, New York, N. Y., assignor to Filtration Equipment Corporation, New York, N. Y., a corporation of Delaware Application April 15, 1936, Serial No. 74,404

9 Claims. (Cl. 210—5)

This invention relates to the clarification treatment of raw sewage, the sludges therefrom, or similar suspensions of colloidal or semi-colloidal material by methods which do not involve the addition of chemicals thereto. More specifically, the invention relates to the treatment of raw sewage or other material of this nature by a flocculation and settling treatment involving the application of new principles of magnetic agglomeration and subsequent settling, as will be hereinafter described. Objects of the invention are to obtain an efficient and relatively complete flocculation of colloidal sewage solids and a settling and removal thereof in the form of a relatively concentrated sludge, this removal and consequent clarification of the sewage effluent being sufficiently complete to render unnecessary the use of coagulating chemicals. Further objects are the provision of clarification systems involving the application of this principle in such a manner that the removal of sewage solids and reduction of the biochemical oxygen demand will be well within the limits prescribed for ordinary municipal sewage disposal plants, both of summer and for winter operation.

In my prior Patent No. 1,877,623 and in other patents of which I am joint inventor, there are described methods involving the treatment of sewage by the formation of a chemical floc therein, the flocculation being promoted by the addition of cellulose pulp or other cellulosic material in a clarification tank. In this system the effluent from the clarifier has been caused to pass through a filter consisting of a bed of magnetite or similar heavy sand in order to remove additional suspended sewage solids which were not completely settled out by the added chemicals. In Patent No. 1,872,759 there is described an apparatus for cleaning magnetite filters of this nature involving the agitation of the magnetite sand by alternately energizing and de-energizing a moving electromagnet and drawing portions of the treated sewage through the agitated portion by means of the magnet. The portion of chemically treated sewage liquid drawn through the filter in this manner is referred to in this patent as "wash water" since it functions to wash the sand of the filter bed free from adhering organic matter.

The present invention is a result of further experiments which I have made using filter beds of this type having an electromagnet associated therewith. I have made the surprising discovery that a filter bed consisting of magnetite, or other magnetic material of this nature will, when magnetized by association with an electromagnet or other magnetic influence, exert an activating or clustering force upon the colloidally suspended sewage particles in such a manner that these particles will be drawn together by the filter in the form of a floc and will settle out in the form of a sludge upon remaining in a quiescent state without the addition of chemicals or other flocculating agents thereto.

This activation of the suspended solids of raw sewage I shall term an "agglomeration" since the term "activation" has acquired a significance in the art of sewage treatment which associates it with the action of bacteria. I am aware that the term "agglomeration" will not be strictly descriptive in all cases of the action which takes place when raw or chemically untreated sewage is passed through a bed of magnetized material, for the action appears to be more closely analogous to the clustering effect which is noted when gas particles are exposed to the action of an electronic discharge. It is very difficult to determine the exact nature of this phenomenon, but I am at present of the opinion that the magnetized particles of the filter bed exert some magnetic influence on the electrical charges which are known to be carried by particles in colloidal suspension. However, this may not be the only cause, or even the chief cause of the remarkable flocculation which is noted when raw sewage is passed through a filter of magnetized material in the above manner; and I do not wish to be limited to any theory or explanation of the results obtained. Accordingly, in the present specification and claims the terms "agglomeration" and "agglomerated state" will be used to express the results obtained by the methods of treatment described, and it is understood that these terms will have no other meaning.

The coagulation and flocculation of the solids of raw sewage which is obtained by the passage thereof through my magnetized filter bed is not necessarily a complete one, but this is also true of flocculation produced by chemical means. In fact, I shall show by actual operating data in the subsequent examples that the degree of flocculation obtained by the operation of my magnetized filter on raw or chemically untreated sewage compares favorably with that obtained by the chemical means described in my prior patent above referred to, from which it is logical to assume that the character of the solids flocculated by the two treatments is the same. Apparently, ordinary sewage contains a certain proportion of solids so finely dispersed as to be incapable of flocculation by any means, and such solids will pass through a system operating either with chemicals or with the magnetic treatment of the present invention. The importance of the present invention, however, does not necessarily reside in the completeness of the removal of solid material, since there is a wide degree of tolerance permitted to ordinary treatment plants, but in the fact that it accomplishes results that have hitherto been accomplished only by the presence of chemicals or other flocculating agents in the sewage. Therefore, it is probable that the use of a magnetized filter for the filtration of sewage which has previously been subjected to a chemical flocculation and settling treatment would not serve to cause any determinable amount of additional flocculation of colloidal sewage solids, for most of the solids of this type would already have been coagulated by the chemicals.

The application of the principles above set forth to ordinary municipal sewage requires only the passage of the sewage liquid through a magnetized filter bed of sufficient depth and fineness to collect and agglomerate the greater part of the sewage solids followed by removal of the agglomerated solids from the filter by forming a suspension thereof in wash water. Such a suspension, after its formation, should be maintained in a quiescent state for a period of time sufficient for the final flocculation and settling of the agglomerated particles to take place, after which the supernatant water may be removed by any convenient means such as decantation, filtration, etc. The sludge so obtained may be treated in any known or approved manner to recover the solid material therefrom; for example, it may be passed to a dewatering filter of the rotary type, dried and burned or used as a fertilizer.

While the invention in its broader aspects is not limited to the recovery of agglomerated sewage solids in "wash water" by the method described in the prior patents above referred to, it is within the scope of the invention to utilize this system and a number of advantages are obtained thereby. This "wash water" amounts in volume to about 3–7% of the total volume of the sewage liquid and yet, in the practice of the present invention, it will normally have a content of sewage solids more than 5 times that of the raw sewage entering the treatment system. This relatively small volume of liquid containing a high proportion of solids in an agglomerated and flocculable state is well suited for separate treatment in a small clarification tank, in which it remains quiescent for a sufficient period of time to permit sedimentation, and it is one of the advantages of the invention that this time for sedimentation is much less than that which is normally used for flocculation during chemical treatment. For example, in a commercial installation using the chemical treatment described in my prior Patent No. 1,877,623, involving the addition to the settled sewage effluent of cellulose pulp, ferric chloride and lime, an average detention period of well over two hours with a settling rate of 680 gals. per square foot per twenty-four hours was used during the calendar year 1933 (see Sewage Works Journal, vol. 6, No. 4, July 1934, page 750). In comparison with this, settling periods of from ten minutes to one-half hour have proven to be sufficient for the sedimentation of wash water when raw sewage of approximately the same strength is treated by a magnetized filter.

Although wash water from the magnetized filters may be separately sedimented in the above described manner, it is a further advantage of the invention that this step may be carried out in conjunction with a preliminary sedimentation of the raw sewage before filtration, which will increase the efficiency of the filter by removing the larger and more dense sewage solids that would otherwise tend to clog it. This is accomplished by simply returning the wash water to the sedimentation tank in the manner shown on Fig. 2 of the drawings, and I have found that a satisfactory sedimentation of the solids in the wash water will take place in this tank even though the wash water is greatly diluted by the raw sewage. In fact, I believe that the presence of the agglomerated sewage solids in the settling tank actually promotes and enhances the settling process which normally takes place therein, for the activation which these solids receive by reason of their passage through the magnetized filter bed causes them to act as nuclei for the coagulation and settling of untreated solids in the raw sewage. Accordingly, this method of treatment not only saves the cost of an additional settling tank, but actually improves the operation of the process as a whole by reducing the load on the filter, and therefore constitutes a preferred modification thereof.

It is apparent that the principles of the invention may be embodied in various installations which differ among themselves in specific details of treatment. The accompanying drawings show in diagrammatic form two flow sheets of installations of this nature, it being understood that these are for purposes of illustration only and that numerous other embodiments may be resorted to within the scope of the broader claims attached hereto, whether or not they may involve additional specific features of invention. One form of sedimentation tank and a few representative types of magnetic filter beds are also illustrated in more or less diagrammatic form, it being understood that these are also in the nature of representative examples and that the invention in its broader aspects is not limited thereto.

Referring now to the drawings, in which similar reference numerals indicate similar parts in the several views, Figures 1 and 2 are flow diagrams illustrating the application of the principles of the invention to a commercial sewage clarification system.

Fig. 3 illustrates a sedimentation tank having a magnetized filter bed and cleaner associated therewith, the parts being shown in vertical section.

Fig. 4 is a top plan view of the installation of Fig. 3, showing the traveling magnets and filter cleaning devices.

Fig. 5 is a vertical section of a filtering installation similar to that of Fig. 3, but operating on the down flow principle.

Fig. 6 is a diagrammatic view of an installation in which the filter is magnetized by the passage of a current through conductors embedded therein, and Fig. 7 is a detail perspective of a portion of Fig. 6, showing the means used for embodying the conductors in the magnetite filtering material.

Referring to Figs. 3 and 4, the installation consists generally in the combination of a settling or sedimentation of tank 1, filter beds 2 of material such as magnetite or ilmenite which is capable of becoming magnetized, together with magnets or solenoids 3 for inducing such magnetism, means such as caisson cleaners 4 for removing agglomerated solids from the filter and forming a suspension thereof in wash water, and pumps 5 and pipes 6 for returning this wash water to the settling tank 1. Since it is apparent that the various elements of this combination may be varied in accordance with the requirements of different installations, they will be discussed separately.

The settling tank 1 may be of any suitable size or shape, and may be circular or rectangular in cross section. It may be provided with scrapers or other sludge collecting means in the manner shown in prior Patent No. 1,969,022, of which I am a joint inventor, or it may consist of a circular tank of the type shown in Patent No. 1,975,109. In all cases, however, it is a feature of the invention that this tank may be of a size materially less than those used in systems employing only plain sedimentation for accomplishing a suitable degree of sewage clarification. The tank illustrated is a rectangular tank having side walls 7, end walls 8 and inclined bottom sections 9 sloping to form a sludge collecting trough 10, from which the sewage sludge is discharged through an outlet pipe 11. The side walls 7 are preferably recessed as at 12 and 13 to form overflow launders, which communicate with outlet chamber 14 at the end of the tank and serve to collect and carry away clarified sewage effluent escaping from the filter through the outlet passages 15 and 16.

The equipment with which the tank 1 is provided for accomplishing the purposes of the present invention includes central baffles 17 and 18, together with inclined baffles 19 and 20 for the introduction of raw or chemically untreated sewage and the filter beds 2 resting on screens 21 which extend from the central baffles 17 and 18 to the walls of the tank. This central baffle structure forms a chamber for the introduction of the raw sewage from an inlet (not shown) and for the simultaneous mixing of this incoming sewage with the wash water discharged through the pipes 6, this introduction and mixing being accomplished without stirring up the main body of quiescent liquid in the tank. The filters 2, as shown on Fig. 4, extend the full length of the tank on either side of the central baffles, and it is apparent that all the sewage liquid discharged from the tank must pass through these filter beds and must be subjected to their magnetic influence. In the installation shown, the filter beds are preferably about 3″ in depth, and consist of magnetite of a sufficient grade of fineness to pass through a 10-mesh sieve but remaining on a sieve of 23-mesh. I have found that magnetite of this particular size has sufficient fineness to collect the greater part of the sewage solids while not offering too great a resistance to the flow of the sewage liquid therethrough. In normal operation, rates of flow up to 6 gallows of sewage liquid per square foot per minute may be used with a filter bed having these characteristics, although a wide variation is possible within the range of normal operating conditions.

The magnetite or similar sand forming the filter bed may be magnetized by any suitable means, which may include either stationary or movable magnets or solenoids or may be accomplished by simply passing a direct current through conductors embedded in the magnetic material.

In the present case I have illustrated the solenoids which are normally contained in the movable caisson cleaners described in prior Patent No. 1,872,759 above referred to, since this installation has given excellent results in practice.

In this patent these solenoids are described as being operated by a pulsating or alternating current, whereas a direct current must be used to obtain the advantages of the present invention but the structure and mounting of the electromagnets remains the same. In some cases it is of advantage to utilize insufficient current in the electromagnets to agitate the magnetite sand of the filter, or to employ a continuous direct current which will have no agitating action. In this case, mechanical agitators of the type described in Patent No. 1,919,564 may be employed for cleaning the filter, the electromagnets being used only for the purpose of magnetizing the material of the filter bed to an extent sufficient for causing flocculation of the sewage solids.

In the drawings the magnets 3 of the device as illustrated are of the solenoid type and have no core, since the filter material provides a path of high magnetic permeability for the lines of force. These lines of force, upon passage through the material of the filter bed, not only cause a displacement of the same by attracting it to the solenoid, but actually transform each particle into an individual small magnet, so that after the material has resettled into the bed the entire filter is magnetized. Since the magnets are permanently attached to the movable caisson cleaner and travel back and forth over the filter bed during the cleaning operation, the entire bed of filtering material is maintained in a magnetized state and operates to cause agglomeration and flocculation of the finely divided sewage solids.

The apparatus for cleaning the filter beds and removing the agglomerated sewage solids therefrom includes cleaning devices mounted upon a traveling carriage which is designated in general by the numeral 22 on Figures 3 and 4. At its opposite ends this carriage is provided with wheels 28 which travel on track rails 29 and are suitably driven by a motor 30 and reducing gears 31 operating upon drive shaft 32. Since the two cleaning devices are duplicates, only one will be described in detail.

Each cleaning device includes a cleaner or cleaning tank 33 of a length substantially equal to the width of its respective filter bed 2. The tank is preferably of such a depth that its top 34 is above the water level while the bottom 35 travels closely adjacent to the upper portion of the filter bed. Lengthwise of the filter bed, this bottom 35 is preferably increased in length by the provision of an apron 36, which is formed by inclining and extending outwardly the front wall 37 of the tank. Within the space beneath this inclined front wall the magnet 3 is mounted, this magnet preferably consisting of a solenoid having semi-circular ends and straight sides extending along the full length of the cleaner tank. In the interior of the tank is mounted a pump 38 driven by a motor 39 and shaft 40, the purpose of which is to continuously withdraw wash water from the inlet of the tank and discharge it through the pipe 6 into the inlet chamber formed between the baffles 19 and 20.

The operation of the above described cleaning devices is fully set forth in Patent No. 1,872,759 above referred to and its description need not be repeated here. It is sufficient to state that these cleaners operate in exactly the same manner when the system is used for the magnetic flocculation of raw or chemically untreated sewage as they do in the case of the chemically pretreated and flocculated sewage of the prior patent.

Figure 5 illustrates the application of the principles of the invention to a filter operating on the downflow principle. In the modification shown, this filter consists of a tank 50 which is provided with side walls 51 and 52, end walls 53 and intermediate walls 54 and 55 which form, together with a portion of the bottom 56 of the tank, an inlet chamer 57. The filter beds 58 may consist of finely divided magnetite or other magnetic material, and are preferably mounted above the bottom of the tank on screens 59 which are supported at their ends by the side walls 51 and 52 and by the intermediate walls 54 and 55. These latter walls are apertured as at 60 to permit an inflow of sewage liquid above the filter beds, and outflow passages 61 are provided below the filter beds to permit the escape of filtered effluent into outflow channels 62 and 63 on the sides of the filter. Movable magnets 64 are provided in juxtaposition to the filter beds 58, these preferably being identical in all respects to the magnets 3 shown in Figures 3 and 4. The filter bed is provided with movable caisson cleaners identical with those shown in Figure 4, and which operate in the same manner to agitate portions of the filter bed and draw wash water therethrough during the cleaning operation.

In the operation of a filter constructed in accordance with Fig. 5, the incoming sewage passes downwardly through the filter beds and flows out through the outlet channels 62 and 63, from which the effluent is preferably discharged into a river, stream or other moving body of water. By reason of the fine division of the filtering materials and the magnetic charge contained thereby, the sewage solids are agglomerated and held back within the interstices of the filter. The cleaning operation which transfers these agglomerated sewage solids to a stream of wash water is preferably carried on continuously by the moving caisson cleaners shown in Fig. 4, the suspension so formed being drawn into the pumps 38 and discharged through the pipes 6 into a sedimentation tank of the type shown in Fig. 3 where flocculation and sedimentation of the sewage solids is completed.

Fig. 6 shows a type of installation in which the material of the filter bed is magnetized by the passage of a direct current therethrough. The filter is preferably constructed of concrete, and consists of a bottom 70, filter supports 71 and side walls 72 and 73. The side wall 72 forms, in conjunction with supporting wall 71, an inlet channel 74 while an outlet channel 75 is formed by the side wall 73 and filter support 71. The filter bed 76 is mounted on a screen 77 in the usual manner, this screen fitting into recesses 78 in the supporting walls 71.

A series of wires 79 are embedded at short intervals within the magnetite or other magnetic material which forms the filter bed 76, these wires preferably being insulated with rubber to protect them from destruction by galvanic action. These wires 79 are all electrically connected at their ends to bus bars 80 and 81 which receive direct current through the medium of positive and negative electrodes 82 and 83 and thus form a path for the passage of an electric current through the material of the filter bed. It should be noted that these wires, being permanently mounted in the material of the filter bed and being stationary with respect thereto, serve to create definite paths of magnetic lines of force which maintain the filter bed in a magnetized condition with the expenditure of only a relatively small amount of current.

The invention will be further illustrated by the following specific examples, which demonstrate the remarkable flocculating action which a magnetized filter will exert upon raw or chemically untreated sewage. In considering the results obtained, however, it should be borne in mind that sewages from different sources will frequently vary considerably in pH, flocculation and settling properties and other characteristics, and that this is particularly true where industrial wastes are present in addition to ordinary domestic sewage. Accordingly, it should be understood that the invention is not limited to the removal by magnetic flocculation of any definite proportion of the total sewage solids, and that its advantages are frequently of great value in cases where only a relatively minor proportion of the total sewage solids is removed in this manner.

EXAMPLE 1

Qualitative comparison

Magnetite of 10–20 mesh is charged into two glass filters in amounts sufficient to form beds of 3 to 4 inches in thickness. Electrodes are inserted in opposite sides of one of the filter beds while the other is left in its normal condition. The filters are flooded with raw sewage and a direct current is passed through the electrodes. After a short period of time the magnetite becomes magnetized, whereupon representative samples of the filtrates from the two filters are drawn off into sample cone glasses. The two filters are then washed with clean water, and samples of the washings are also collected in sample cone glasses.

A remarkable difference is noted between the two filtrates. The liquid from the unmagnetized filter is cloudy and presents the usual appearance of liquids of this character that have passed through an ordinary coarse, unripened filter. This cloudiness is relatively permanent, by reason of the fineness of the particles of sewage solids in suspension and their relatively low specific gravity. The liquid from the magnetized filter, on the other hand, is relatively clear.

A comparison of the wash water is even more illustrative of the difference in action of the two filter beds. That from the unmagnetized filter contained the solids in a loose, unflocculated form, and sedimentation in the cone glass was incomplete even after standing for ½ hour. The wash water from the magnetized filter was quite different; its solids were present in the form of relatively dense, agglomerated floccules which settled out in the cone glass in less than 10 minutes.

EXAMPLE 2

Comparison with chemical treatment

Comparative tests were made in a municipal plant which treats the sewage from an industrial city of some 45,000 inhabitants. This sewage drains from an area of 4 square miles, and averaged about 3 million gallons per day during the testing period. It was fairly strong in character and contained a considerable proportion of industrial waste in addition to the ordinary domestic sewage content. The 5 day Biochemical Oxygen Demand (B. O. D.) averaged about 280 parts per million, the total solids 735 p. p. m., the settleable solids 4.0 c. c. per liter, and the suspended solids 240 p. p. m. with 69.5 per cent volatile. The pH of the raw sewage averaged 7.1.

The treatment process of this plant consisted essentially of five steps: (1) coarse screening; (2) chemical coagulation; (3) sedimentation; (4) filtration; and (5) chlorination of the effluent. The sedimentation tanks and filters were of the construction illustrated in Figs. 3 and 4 of the drawings, with the exception that they were circular in cross section and a sampling pipe was inserted to draw off filter influent from a point just below the screen 21. The chemicals added were ferric chloride and lime.

In order to evaluate the advantages of the present invention, this plant was operated for alternate periods with and without the elimination of step (2); that is to say, the addition of chemicals, but with the filters magnetized at all times. Samples were collected hourly of the raw sewage, the filter influent, the effluent before chlorination and the wash water. These samples were collected in pint Mason jars, immediately placed in a refrigerator and, at the end of each 24 hour period, composited according to flow as recorded on a Venturi meter chart. A period of 24 hours was allowed between operations with and without chemical treatment during which no samples were collected, in order to permit the process to become stabilized. The results of analyses of these samples are tabulated as follows:

The percentage reduction and character of the suspended solids removed by the filter is also significant to show the flocculating action of the magnetized filter bed. While the total reduction is of course much greater when coagulating chemicals are added, it should be noted that the concentrations of solids in the wash water are of about the same order of magnitude. An inspection of the wash water obtained with raw sewage shows that a good floc is present, resulting in rapid settling of the greater portion of the solids contained therein, and the total overall reduction figure of 70% is well within the figure required of most sewage treatment plants.

It will thus be seen that the present invention permits the elimination of chemicals in a number of installations where this additional expenditure had previously been considered necessary. The municipal plant described in the foregoing example is a case in point; upon completion of the tests which have been described this plant discarded the use of chemicals and now operates only with sedimentation and magnetic flocculation. Additional advantages are also realized by the installation of the magnetized filters of the present invention in plants now operating on plain sedimentation only, for the capacity of the

|  | Plain sedimentation and filtration, 9 days' average | With chemical treatment, 7 days' average |
|---|---|---|
| Sewage flow—M. G/day | 3.00 | 2.80 |
| Raw sewage—suspended solids p. p. m | 240 | 238 |
| Raw sewage 5 day B. O. D., p. p. m | 285 | 274 |
| Detention in clarifier, hours | 3.23 | 3.45 |
| Sewage below filter susp. solids—p. p. m | 120 | 97 |
| Sewage below filter 5 day B. O. D., p. p. m | 174 | 131 |
| Effluent suspended solids p. p. m | 71 | 21 |
| Effluent 5 day B. O. D., p. p. m | 145 | 118 |
| Percentage reduction in susp. solids—overall | 70.0 | 89.4 |
| Percentage reduction in susp. solids—below filter (by settling or precipitation) | 49.5 | 56.6 |
| Percentage reduction in susp. solids through filter | 20.5 | 32.8 |
| Percentage reduction in 5 day B. O. D.—overall | 46.4 | 53.9 |
| Percentage reduction in 5 day B. O. D.—below filter | 34.8 | 48.2 |
| Percentage reduction in 5 day B. O. D.—through filter | 11.6 (29 p. p. m.) | 5.7 (13 p. p. m.) |
| Wash water suspended volatile—percent | 67.0 | 57.6 |
| Lime dosage—p. p. m. CaO | None | 77.5 |
| Ferric chloride dosage—p. p. m. FeCl₃ | None | 33.8 |

These results demonstrate the fact previously stated, namely, that a large proportion of those sewage solids which are flocculable by the addition of chemicals are also flocculated by the operation of a magnetized filter when no chemicals are added. The B. O. D.-reduction figures are particularly noteworthy in this connection, for this is the most difficult figure to reduce in the treatment of sewage. It represents the amount of putrescible matter in the sewage content, a large part of which is present in a very finely divided form and which resists to a great extent even the action of coagulating chemicals. For example, it will be seen that by the addition of chemicals this figure is reduced from 274 to 131 p. p. m., a reduction of about 52%. Upon filtration an additional 5% reduction is obtained. When no chemicals are added the figure is reduced from 285 to 174 p. p. m. by settling and an additional 10% is removed by the filter. The final figures in each case are within 7% of each other, which is an agreement well within the ordinary variation of this figure in domestic sewage.

plant can be increased thereby with a simultaneous improvement in the quality of the effluent.

What I claim is:

1. A method of clarifying suspensions containing organic colloidal or semi-colloidal materials in a chemically untreated state, which comprises passing said chemically untreated organic colloidal suspensions through a bed of magnetized material of substantial depth and fineness, whereby flocculable solids of the suspension are magnetically transformed to an agglomerated state and are retained by the bed in this form.

2. A method of clarifying raw or chemically untreated sewage which comprises passing said raw sewage containing flocculable organic sewage solids through a filter bed of magnetized material of substantial depth and fineness, whereby flocculable solids of the sewage are magnetically transformed to an agglomerated state and are retained by the filter in this form.

3. A method according to claim 1, in which the filter is magnetized by the passage of a movable magnet over the surface thereof.

4. A method according to claim 1, in which the filter is magnetized by the passage of a direct current of electricity through conductors embedded therein.

5. A method of clarifying raw or chemically untreated sewage which comprises subjecting said raw sewage to a preliminary sedimentation and passing the effluent therefrom in a form containing flocculable sewage solids through a filter bed of magnetized material of substantial depth and fineness, whereby flocculable solids of the sewage are magnetically transformed to an agglomerated state and are retained by the filter in this form.

6. A method according to claim 5 in which the filter is magnetized by the passage of a direct current of electricity through conductors embedded therein.

7. A method of clarifying raw or chemically untreated sewage and recovering colloidal material therefrom which comprises passing said raw sewage containing flocculable sewage solids through a filter bed of magnetized material of sufficient depth and fineness to collect sewage solids therefrom, whereby said solids are magnetically transformed to an agglomerated state in which they are capable of sedimentation upon standing, removing the agglomerated solids from the filter by forming a suspension thereof in wash water, maintaining said water suspension in a quiescent state until sedimentation of the agglomerated particles has taken place, and separating the floc so obtained from the supernatant water.

8. A method of clarifying raw or chemically untreated sewage and recovering colloidal material therefrom which comprises subjecting said sewage to a preliminary sedimentation clarification, passing the resulting chemically untreated sewage in a state in which it contains flocculable sewage solids through a filter bed of magnetized material of sufficient depth and fineness to collect sewage solids therefrom, whereby said solids are magnetically transformed to an agglomerated state in which they are capable of sedimentation upon standing, removing the agglomerated solids from the filter by forming a suspension thereof in wash water, maintaining said water suspension in a quiescent state until sedimentation of the agglomerated particles has taken place, and separating the floc so obtained from the supernatant water.

9. A method of clarifying raw or chemically untreated sewage and recovering colloidal material therefrom which comprises subjecting a body of said sewage to sedimentation clarification in a relatively quiescent state under conditions resulting in the deposition of settleable solids therefrom, passing the resultant chemically untreated supernatant liquid in a state in which it contains flocculable sewage solids through a filter bed of magnetized material of sufficient depth and fineness to collect the sewage solids therefrom, whereby said solids are magnetically transformed to an agglomerated state in which they are capable of flocculation upon standing, removing the agglomerated solids from the filter by forming a suspension thereof in wash water, and mixing said water suspension with the main body of sewage undergoing sedimentation whereby flocculation and settling of the agglomerated particles take place in the presence of the raw sewage solids.

WILLIAM C. LAUGHLIN.